3,138,589
PROCESS FOR THE PRODUCTION OF
6-HALO-3-KETO-Δ⁴,⁶-STEROIDS
Howard J. Ringold, Carl Djerassi, Albert Bowers, and Mercedes Velasco, all of Mexico City, Mexico, assignors, by mesne assignments, to Syntex Corporation, a corporation of Panama
No Drawing. Filed Nov. 30, 1959, Ser. No. 856,012
Claims priority, application Mexico Mar. 4, 1959
19 Claims. (Cl. 260—239.55)

The present invention relates to a new process for the production of 6-halo-3-keto-Δ⁴,⁶ stereoids. This application is a continuation-in-part application of our co-pending application Serial No. 826,120, filed July 10, 1959.

The final products which are obtained by the new process comprises the 6-halo-, and preferably the 6-fluoro- 6-chloro- and 6-bromo derivatives of Δ⁴,⁶-3-ketones of the androstane and pregnane series, and are valuable hormones or intermediates for the preparation of such hormones, as well as the esters of such compounds.

It has been conventional in the past to produce 6-halo-Δ⁴,⁶-3-keto-steroids from Δ⁴-3-keto steroids by first introducing the halogen atom, preferably fluorine or chlorine, in 6-position via the 5α,6α-epoxide and then to dehydrogenate the resulting 6-halo-Δ⁴-3-ketone with chloranil in suitable organic solvents to introduce a double bond between C-6 and C-7.

We have discovered that 6-halo-Δ⁴,⁶-3-keto steroids can be produced in a much more satisfactory manner and with superior yields, when reversing the order of operation described above and first introducing the C-6,7-double bond, then producing the respective 6β-halo-7α-hydroxy derivative via the 6α,7α-epoxide and thereafter dehydrating the halohydrin to reconstitute the double bond between C-6 and C-7. It is an important feature of the process of the present invention that the 6β-halo-7α-hydroxy derivatives are obtained from the 6-unhalogenated steroid analogs having a double bond at C-6,7 via their 6α,7α-oxido compounds.

The new process according to the invention is illustrated by the following reaction diagram which is already described but not claimed by us in our co-pending patent application Serial No. 826,120, filed July 10, 1959.

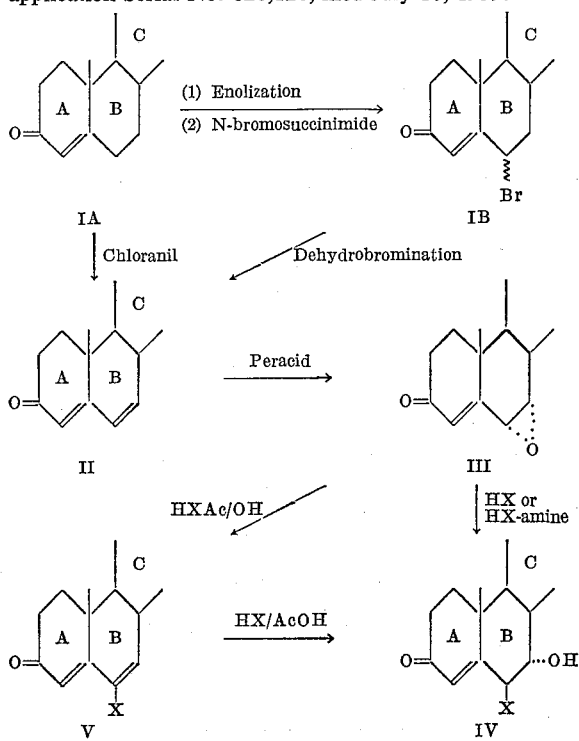

In these formulas X represents a halogen atom selected from the group of fluorine, chlorine and bromine.

As a first step in the process of the invention the introduction of a double bond at C-6 into the starting compound IA is carried out by reaction with chloranil, for example by refluxing a solution of the steroid IA in a mixture of ethyl acetate and glacial acetic acid with chloranil.

Alternatively, the Δ⁴-3-ketones are first converted into their 6β-bromo-derivatives IB, for example by reaction of their 3-ethyleneolethers (VI below) with N-bromosuccinimide in aqueous acetone and in the presence of a buffer, and the 6β-bromo compounds are then dehydrobrominated, either by reaction with calcium carbonate in mixture with dimethylformamide or by refluxing with a tertiary amine such as collidine.

This process phase can be illustrated by the following reaction equations:

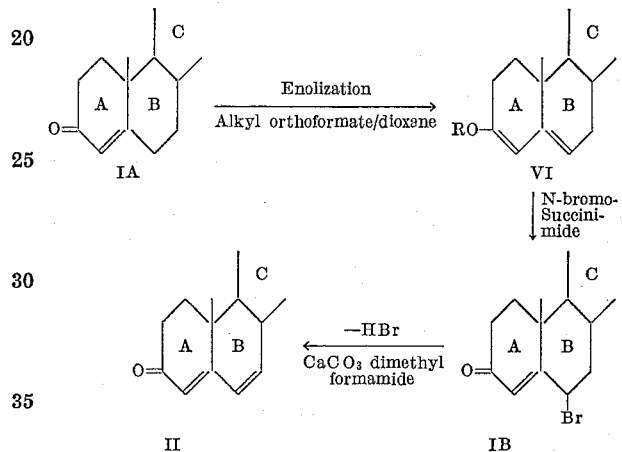

The epoxidation of the double bond of compound II is then effected with an appropriate peracid, such as for example with monoperphthalic acid in a mixture of methylene chloride or chloroform and ether; the conversion of the 6α,7α-epoxide III into the 6-halo-6-dehydro compounds V comprises the opening of the epoxide ring by the addition of the elements of the hydrogen halide and the subsequent dehydration of the resulting intermediate 6β-halo-7α-hydroxy compound IV. Thus, for preparing the 6-fluoro-6-dehydro compounds the epoxides are treated with hydrogen fluoride in mixture with tetrahydrofurane and chloroform, at low temperature, and the resulting 6β-fluoro-7α-hydroxy compound is dehydrated through the action of dry hydrogen chloride in acetic acid solution. When preparing the 6-chloro-6-dehydro compounds there is no need to use two separate reactions; the opening of the epoxide ring and the dehydration are achieved in a single step by treating the epoxide with dry hydrogen chloride in glacial acetic acid solution. In the same manner, for preparing the 6-bromo-6-dehydro compounds, the epoxides are treated with dry hydrogen bromide in glacial acetic acid at room temperature for about 2 hours.

Suitable organic solvents in which the opening of the 6α,7α-epoxide with a hydrogen halide is effected are, for example, lower aliphatic carboxylic acids, ketones, ethers, and halogenated hydrocarbons, or mixtures of such solvents; typical solvents are acetic acid, propionic acid, acetone, methylene chloride, chloroform and tetrahydrofurane.

The 6β-halo-7α-hydroxy compounds are also obtained by treatment of the 6α,7α-oxido compounds with the halohydrides of cyclic tertiary amines such as pyridine or dimethylaniline, conveniently in an alcoholic solvent such as ethanol or t-butanol.

The method of the present invention may be applied to preparing the 6-dehydro-6-fluoro-, 6-dehydro-6-bromo- and 6-dehydro-6-chloro derivatives from a broad variety of starting materials belonging to the Δ⁴-3-ketones of the androstane and pregnane series. The functional groups in the rest of the steroid nucleus and in the side chain usually do not interfere with these reactions except that no additional isolated carbon-to-carbon double bonds more susceptible to reaction than the 6(7)-double bond in the epoxidation step, nor unprotected hydroxy groups (other than those vicinal to a keto group) susceptible to ready dehydration may be present. Specifically, the starting compounds may possess: alkyl groups at C-2 and C-16; 17β-acyloxy-, 17-keto-, 17α-alkyl-17β-acyloxy- and 17α-alkynyl-17β-acyloxy groups; a keto or hydroxy function at C-11 (the latter to be protected, if necessary, during the dehydration step) which may be further accompanied by a halogen function at C-9α; an esterified or unesterified ketol or dihydroxy-acetone side chain or a β-acetyl-, α-hydroxy-β-acetyl or α-acyloxy-β-acetyl group at C-17; an acyloxy group at C-16 and a cyclic ketal or acetal group at C-16,17. It falls within the scope of the invention to apply the method to compounds with certain other substitutents, though not specifically listed in the preceding survey.

The new process can be equally applied either to steroids having an angular methyl group at C-10 or to 19-nor-steroids.

In the treatment of a compound having a β-hydroxyl group at C-11 and not having a halogen atom at C-9α with the hydrogen halide in acetic acid or acetone, it is convenient to protect temporarily such β-hydroxy group against dehydration to the 9(11)-unsaturated derivative, for example by esterification with trifluoroacetic acid.

In view of the fact that none of the chemical reactions described heretofore as leading from compound II to V involve any hydrolyzing or esterifying effect, one may start from the 17α-acyloxy compounds and then, if desired, the final compounds may be saponified; or one may start from the 17α-hydroxy compounds and then; if desired, the final compounds may be esterified. In the latter case the final esterification is conveniently effected by heating a pyridine solution of the 17α-hydroxy compound with the corresponding acid anhydride, at 90° C. for a period between 8 and 72 hours or with a mixture of acetic anhydride-acetic acid in the presence of p-toluene-sulfonic acid for 1 hour at room temperature.

By dehydrogenation at C-1,2, the 4,6-dienes can be converted into the respective 1,4,6-trienes.

We can thus produce by the process according to the present invention and with superior yields the important 6-halo-Δ⁴,⁶ and Δ¹,⁴,⁶-steroidal hormones described in patent applications Serial No. 743,466, filed June 20, 1958; Ser. No. 753,626, filed August 7, 1958, now Pat. No. 2,997,489; Ser. No. 754,923, filed August 14, 1958; Ser. No. 826,119, filed July 10, 1959; Ser. No. 826,120, filed July 10, 1959; Ser. No. 826,121, filed July 10, 1959; and Ser. No. 830,211, filed July 29, 1959.

The intermediates in the process according to our invention, expressed by the partial Formula II, include compounds having the general formula:

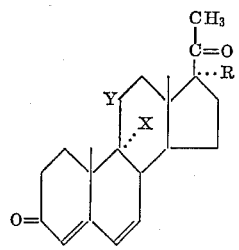

wherein X is selected from the group consisting of hydrogen, fluorine, chlorine and bromine; Y is selected from the group consisting of hydrogen, =O and

when X is hydrogen, and Y is selected from the group consisting of =O and

when X is one of the aforesaid halogens; and R is selected from the group consisting of hydrogen, hydroxyl and the acyloxy group of a hydrocarbon carboxylic acid having up to 12 carbon atoms, saturated or unsaturated, of straight, branched, cyclic or mixed cyclic-aliphatic chain, which may be substituted with functional groups such as hydroxyl, O-acyl (acyl as specified above), alkoxy (up to 5 carbon atoms) or halogen, such as fluorine or chlorine for example; typical esters are, among others, the acetates, propionates, iso-butyrates, hemisuccinates, enanthates, caproates, benzoates, trimethylacetates, phenoxyacetates, cyclopentylpropionates and β-chloropropionates. Among these compounds there is the valuable 6-dehydro-17α-hydroxy-progesterone and hydrocarbon carboxylic acyl esters thereof. These compounds are also potent progestational agents. Thus it was found that 6-dehydro-17-acetoxy-progesterone is about 25 times more active than 17-acetoxy-progesterone as a progestational drug.

The method of the present invention can be modified within wide limits, both with respect to the reagents and solvents employed as with respect to the conditions of temperature and time under which the reactions are carried out. For example, the chlorine atom at C-6 can be introduced in two stages by first forming the 6β-chloro-7α-hydroxy chlorohydrin, for example by reaction with dry hydrogen chloride in chloroform or with the hydrochloride of a tertiary amine in an alcoholic solvent such as methanol, at low temperature, and then dehydrating by treatment with dry hydrogen chloride in acetic acid solution; the acetic acid may be replaced by other suitable solvents such as acetone or chloroform; the treatment of the 6,7-halohydrins with dry hydrogen chloride can be substituted by a treatment with any other acid sufficiently strong to cause the dehydration, such as perchloric acid; in the dehydrogenation with selenium dioxide, t-butanol may be substituted by another solvent, such as chlorobenzene, or there may be used another tertiary alcohol with another basic catalyst, such as collidine; the double bond at C-1 can also be introduced by microbiological methods, such as incubation with *Corynebacterium simplex* ATCC 6946.

The invention will be further illustrated but not limited by the following examples:

*Example 1*

A mixture of 5 g. of 17α-ethinyl-19-nor-testosterone acetate (German Patent 1,017,166), 10 g. of chloranil, 125 cc. of ethyl acetate and 25 cc. of acetic acid was refluxed under an atmosphere of nitrogen for 20 hours. The solution was cooled, washed with 10% aqueous sodium hydroxide solution until the washings were colorless, dried over anhydrous sodium sulfate and evaporated to dryness under reduced pressure. Chromatography on neutral alumina yielded 17α-ethinyl-19-nor-Δ⁴,⁶-androstadien-17β-ol-3-one acetate, M.P. 177–178° C., [α]$_D$ −178° (chloroform), $\lambda_{max.}^{EtOH}$ 282–284 mμ, log ε 4.44

A solution of 3 g. of the above acetate in 200 cc. of methylene chloride was mixed with 200 cc. of a 5.5% solution of monoperphthalic acid (6 molar equivalents) in ether and kept for 48 hours at room temperature; the mixture was then washed with 5% aqueous sodium carbonate solution and then with water, dried over anhydrous sodium sulfate and concentrated until crystallization started. The mixture was cooled and the precipitate was collected by filtration and air dried. There was thus obtained 17α-ethinyl-19-nor-6α,7α-oxido-testosterone acetate.

A solution of 2 g. of 17α-ethinyl-19-nor-6α,7α-oxido-testosterone acetate in 160 cc. of anhydrous chloroform was cooled in a Dry Ice-acetone bath at —70° C. and treated with a mixture of 4.5 cc. of anhydrous tetrahydrofurane and 3.2 g. of dry hydrogen fluoride, little by little and under stirring. The mixture was allowed to reach room temperature and kept for 20 hours at this temperature; it was then poured into 1 lt. of 5% aqueous potassium carbonate solution mixed with ice, under vigorous stirring; the organic layer was separated, washed with water to neutral, dried over anhydrous sodium sulfate and evaporated to dryness. This residue consisted of the crude 6β-fluoro-7α-hydroxy-17α-ethinyl-19-nor testosterone acetate.

A slow stream of dry hydrogen chloride was introduced into a solution of 2 g. of the above compound in 100 cc. of glacial acetic acid until saturation and then the container was closed by a stopper and kept at room temperature for 4 hours; after pouring into ice cold salt solution, the product was extracted with methylene chloride, the extract was washed with 5% aqueous sodium carbonate solution and water, dried over anhydrous sodium sulfate and evaporated to dryness, thus leaving as a residue 6-fluoro-17α-ethinyl-19-nor-$\Delta^{4,6}$-androstadien-17β-ol-3-one acetate.

A solution of 1 g. of the latter acetate in 100 cc. of methanol containing 1 g. of potassium hydroxide was refluxed for 1 hour in a nitrogen atmosphere. The solution was neutralized with acetic acid, concentrated to a small volume and poured into 500 cc. of water. The precipitate was collected and crystallized from acetone-ether, thus affording the free 6-fluoro-17α-ethinyl-19-nor-$\Delta^{4,6}$-androstadien-17β-ol-3-one.

*Example 2*

A slow stream of dry hydrogen chloride was introduced, at 15–18° C. into a suspension of 1.0 g. of 17α-ethinyl-19-nor-6α,7α-oxido-testosterone acetate, prepared in accordance with Example 1, in 35 cc. of glacial acetic acid. After a short time the solid material entered into solution and the treatment with dry hydrogen chloride was continued at room temperature for a total of 5 hours. The mixture was concentrated to one third of its original volume by distillation under reduced pressure, without heating. It was then poured into ice water and the precipitate was collected by filtration, washed with water to neutral, dried and recrystallized from acetone. There was thus obtained 6-chloro-17α-ethinyl-19-nor-$\Delta^{4,6}$-androstadien-17β-ol-3-one acetate.

Saponification as described in the last paragraph of Example 1, yielded 6-chloro-17α-ethinyl-19-nor-$\Delta^{4,6}$-androstadien-17β-ol-3-one.

*Example 3*

A slow stream of dry hydrogen bromide was introduced at 15–18° C. into a suspension of 1 g. of 17α-ethinyl-19-nor-6α,7α-oxido-testosterone obtained in accordance with Example 1, in 35 cc. of glacial acetic acid. The solid material dissolved after a short time and the treatment with hydrogen bromide was continued for 5 hours further at room temperature. The mixture was concentrated at room temperature and under reduced pressure to a final volume of about 12 cc., and was then poured into water. The resulting precipitate was collected, washed with water to neutral, dried and recrystallized from acetone-hexane. There was thus obtained 6-bromo-17α-ethinyl-19-nor-$\Delta^{4,6}$-androstadien-17β-ol-3-one acetate.

Saponification as described in the last paragraph of Example 1, yielded 6-bromo-17α-ethinyl-19-nor-$\Delta^{4,6}$-androstadien-17β-ol-3-one.

*Example 4*

A solution of 5.65 g. of 17α-ethinyl-19-nor-testosterone in a mixture of 28 cc. of dioxane and 5.65 cc. of ethyl orthoformate was treated with 0.72 cc. of a solution of p-toluenesulfonic acid in dioxane (prepared by dissolving 0.488 g. of p-toluenesulfonic acid in 5.4 cc. of dioxane and 1.1 cc. of absolute ethanol) and stirred for 75 minutes at room temperature; 2 cc. of pyridine was then added and the solution was evaporated to dryness. The crystalline residue was washed with hexane and the crude product amounting to about 4.3 g. was crystallized from hexane, thus affording 17α-ethinyl-19-nor-3-ethoxy-$\Delta^{3,5}$-androstadien-17β-ol, having a melting point of 187–189° C., $[\alpha]_D$ —228° (chloroform);

$$\lambda_{max.}^{EtOH} \ 242 \ m\mu, \ \log \epsilon \ 4.35$$

A solution of 4.1 g. of the above product in 70 cc. of acetone was successively treated with 2.5 g. of sodium acetate, 25 cc. of water, 3.31 g. of N-bromosuccinimide and 1.04 g. of acetic acid. The mixture was stirred at a temperature of 5° C. for 75 minutes, an excess of water was added and the product was extracted with ether. The solvent was evaporated and the residue was refluxed for 1 hour under an atmosphere of nitrogen with 8.0 g. of calcium carbonate in 100 cc. of dimethylformamide. The mixture was filtered, the residue was discarded and the filtrate evaporated to dryness under reduced pressure. Crystallization of the residue from methanol furnished 17α-ethinyl-19-nor $\Delta^{4,6}$-androstadien-17β-ol-3-one, M.P. 251–252° C., $[\alpha]_D$ —151° (chloroform).

$$\lambda_{max.}^{EtOH} \ 284 \ m\mu, \ \log \epsilon \ 4.38$$

A solution of 2.2 g. of the above dienolone in 240 cc. of chloroform was mixed with 65 cc. of a 1.04 N solution of monoperphthalic acid in ether and kept at room temperature for 40 hours; the mixture was diluted with 100 cc. of methylene chloride and washed with 5% aqueous sodium carbonate solution and then with water, dried over anhydrous sodium sulfate and evaporated to dryness. Recrystallization of the residue (1 g.) from acetone afforded 17α-ethinyl-19-nor-6α,7α-oxido testosterone, $$\lambda_{max.}^{EtOH} \ 240–242 \ m\mu, \ \log \epsilon \ 4.18$$

1 g. of this substance was treated with hydrogen chloride as described in Example 2, and thus there was obtained 6-chloro-17α-ethinyl-19-nor-$\Delta^{4,6}$-androstadien-17β-ol-3-one identical with the compound obtained in Example 2.

*Example 5*

By applying the reactions for the introduction of a double bond at C-6, described in the preceding example, to the acetate of 17α-ethinyl-19-nor-testosterone, there was obtained the acetate of 17α-ethinyl-19-nor-$\Delta^{4,6}$-androstadien-17β-ol-3-one, identical with the intermediate obtained in Example 1.

*Example 6*

A solution of 2 g. of 17α-ethinyl-19-nor-6α,7α-oxido-testosterone (obtained in accordance with the method described in Example 4) in 160 cc. of anhydrous chloroform was cooled to —70° C. in a Dry Ice-acetone bath and treated with a mixture of 4.5 g. of anhydrous tetrahydrofurane and 3.2 g. of dry hydrogen fluoride, little by little and under stirring. The mixture was allowed to reach room temperature and then kept at this temperature for 20 hours; it was poured into 1 lt. of 5% aqueous potassium carbonate solution mixed with ice, under vigorous stirring; the organic layer was separated, washed with water to neutral, dried over anhydrous sodium sulfate and evaporated to dryness. The residue consisted of 6β-fluoro-7α-hydroxy-17α-ethinyl-19-nor-testosterone in crude form.

A solution of 2 g. of the above compound in 100 cc.

of glacial acetic acid was saturated with a slow stream of dry hydrogen chloride, the container was closed by a stopper and the mixture kept at room temperature for 4 hours; after pouring into ice cold salt solution the product was extracted with methylene chloride and the extract was washed with 5% aqueous sodium carbonate solution and water, dried over anhydrous sodium sulfate and evaporated to dryness, thus leaving as a residue 6-fluoro-17α-ethinyl-19-nor-$\Delta^{4,6}$-androstadien-17β-ol-3-one.

*Example 7*

By applying the reaction with hydrogen bromide described in Example 3, to 17α-ethinyl-19-nor-6α,7α-oxidotestosterone, obtained in accordance with Example 4, there was obtained 6-bromo-17α-ethinyl-19-nor-$\Delta^{4,6}$-androstadien-17β-ol-3-one, identical with the product obtained from Example 3.

*Example 8*

5 g. of 17a-(2-methallyl)-19-nor-testosterone described in Patent No. 2,838,530 was dehydrogenated at C-6 exactly as described for this reaction in Example 4, thus yielding 17α-(2-methallyl)-19-nor-$\Delta^{4,6}$- androstadien-17β-ol-3-one.

A mixture of 2 g. of the above compound, 10 cc. of pyridine and 5 cc. of acetic anhydride was heated for 24 hours at 90° C., poured into water, heated on a steam bath for 2 hours, and cooled, and the product was extracted with methylene chloride; the extract was washed with water, dried and evaporated to dryness. Crystallization of the residue from acetone-hexane furnished 17α -(2-methallyl)- 19-nor-$\Delta^{4,6}$-androstadien-17β-ol-3-one acetate.

Upon subsequent epoxidation, as described in Example 1, followed by reaction with hydrogen fluoride as described also in Example 1, and dehydration of the intermediarily formed fluorohydrin with gaseous hydrogen chloride, there was obtained the acetate of 6-fluoro-17α-(2-methallyl)-19-nor-$\Delta^{4,6}$-androstadien-17β-ol-3-one.

By saponification of the acetate of the above 6-fluoro compound, following the procedure described in Example 1, there was obtained the free 17β-hydroxy compound.

*Example 9*

The preceding example was repeated but the intermediary 6α,7α epoxide of 17α-(2-methallyl)-19-nor-$\Delta^{4,6}$-androstadien-17β-ol-3-one acetate was treated with hydrogen chloride as described in Example 2 and there was obtained 6-chloro-17α-(2-methallyl)-19-nor-$\Delta^{4,6}$-androstadien-17β-ol-3-one acetate. The latter was saponified as described in Example 1 to the free 17β-hydroxy compound.

*Example 10*

Example 9 was repeated but the intermediary 6α,7α-epoxide of 17α-(2-methallyl-19-nor-$\Delta^{4,6}$-androstadien-17β-ol-3-one acetate was treated with hydrogen bromide as described in Example 3, and there was obtained 6-bromo-17α -(2-methallyl)- 19-nor-$\Delta^{4,6}$-androstadien-17β-ol-3-one acetate. The latter was saponified as described in Example 1 to the free 17β-hydroxy compound.

*Example 11*

To a solution of 6 g. of $\Delta^4$-androstene-3,17-dione in 50 cc. of anhydrous dioxane there were added 6 cc. of ethyl orthoformate and 200 mg. of p-toluenesulfonic acid and the mixture was stirred until the color turned to emerald green, which occurred in about 30 minutes; 5 cc. of pyridine was then added, when the color changed to yellow, and the mixture was poured into water and cooled. The precipitate was collected, washed with water, dried and recrystallized from methanol containing a little pyridine. There was thus obtained 3-ethoxy-$\Delta^{3,5}$-androstadien-17-one.

A mixture of 5 g. of the above compound, 140 cc. of acetone, 1.6 g. of anhydrous sodium acetate and 16 cc. of water was cooled to 0° C. and treated with 5 g. of N-bromosuccinimide followed by 1.6 cc. of glacial acetic acid, under continuous stirring. The mixture was kept at 0° C. for 2 hours further, poured into water and the precipitate formed was collected, washed with water, dried and recrystallized from acetone-ether. There was thus obtained 6β-bromo-$\Delta^4$-androstene-3,17-dione.

A solution of 3 g. of the above compound in 10 cc. of dimethylformamide was added to a vigorously stirred suspension of 1.5 g. of calcium carbonate in 30 cc. of dimethylformamide which had previously been heated nearly to boiling and the mixture was refluxed for 15 minutes. The cooled mixture was poured into water, acidified with hydrochloric acid and the precipitate was collected, washed with water, dried and recrystallized from acetone-hexane, thus yielding $\Delta^{4,6}$-androstadiene-3,17-dione.

A solution of 2.5 g. of $\Delta^{4,6}$-androstadiene-3,17-dione in 150 cc. of methylene chloride was treated with 125 cc. of a 5% solution of monoperphthalic acid in ether and the mixture was kept at room temperature for 24 hours; the solution was washed with 5% aqueous sodium carbonate solution and water, dried over anhydrous sodium sulfate and concentrated until crystallization started. After cooling the precipitate was collected by filtration and air dried. Upon subsequent chromatography on silica gel there was isolated 6α,7α-oxido-$\Delta^4$-androstene-3,17-dione.

A stirred solution of 2 g. of the above compound in 160 cc. of anhydrous chloroform was cooled in a Dry Ice-acetone bath and then slowly treated with a mixture of 5 g. of anhydrous tetrahydrofurane and 3.4 g. of anhydrous hydrogen fluoride. Processing of the mixture as described in Example 6, afforded 6β - fluoro - 7α-hydroxy-$\Delta^4$-androstene-3,17-dione.

A slow stream of dry hydrogen chloride was introduced for 3 hours into a solution of 1 g. of the above compound in 50 cc. of glacial acetic acid, maintaining the temperature at 5° C. After pouring into water the precipitate was collected, washed with water, dried and recrystallized from acetone-hexane, thus yielding 6-fluoro-$\Delta^{4,6}$-androstadiene-3,17-dione.

*Example 12*

A mixture of 5 g. of 17α-methyl-testosterone acetate, 10 g. of chloranil, 125 cc. of ethyl acetate and 25 cc. of acetic acid was refluxed for 55 hours under an atmosphere of nitrogen. After cooling it was washed with 10% aqueous sodium hydroxide solution until the washings were colorless; the solution was washed with water to neutral, dried over anhydrous sodium sulfate and the solvent was evaporated. By chromatography of the residue on neutral alumina there was obtained 6-dehydro-17α-methyl-testosterone acetate.

Epoxidation with monoperphthalic acid as described in Example 11 yielded 17α-methyl-6α,7α-oxido-$\Delta^4$-androsten-17β-ol-3-one acetate.

A mixture of 1 g. of the above compound, 2 g. of pyridine hydrofluoride and 50 cc. of t-butanol was refluxed for 24 hours, cooled, diluted with water and the reaction product was extracted with ethyl acetate. The extract was washed with water, dried over anhydrous sodium sulfate and evaporated to dryness; the residue was purified by chromatography on neutral alumina, thus producing 17α-methyl-6β-fluoro-$\Delta^4$ - androstene - 7α,17β-diol-3-one 17-acetate.

Upon subsequent reaction with dry hydrogen chloride in acetic acid solution, in accordance with the method described in Example 1 for this reaction, there was obtained 6-fluoro-17α-methyl-$\Delta^{4,6}$-androstadien-17β-ol-3-one acetate.

A mixture of 500 mg. of the above compound and 10 cc. of 1% methanolic potassium hydroxide solution was stirred under an atmosphere of nitrogen for 4 hours at a temperature around 40° C. and then acidified with acetic acid and concentrated to a small volume; the mixture was diluted with water and the precipitate was collected, washed with water, dried and recrystallized from acetone-hexane, thus yielding 6-fluoro-17α-methyl-6-dehydro-testosterone in the free form.

*Example 13*

By the dehydrogenation method described in Example 1, 9α-bromo-11-keto-progesterone, disclosed in U.S. Patent 2,852,511 was converted into the corresponding 9α-bromo-6-dehydro-11-keto-progesterone.

In accordance with the epoxidation method described in Example 14, this compound was treated in chloroform solution, with an ether solution containing 6 molar equivalents of monoperphthalic acid, and the mixture was kept for 24 hours at room temperature. The crude product was isolated and finally purified by chromatography on alumina, thus yielding 6α,7α-oxido-9α-bromo-11-keto-progesterone.

A solution of 2 g. of the above compound in 100 cc. of glacial acetic acid was treated with dry hydrogen chloride for 3 hours at 15° C. After precipitation with water followed by chromatography of the product on neutral alumina, there was obtained 6-chloro-9α-bromo-$\Delta^{4,6}$-pregnadiene-3,11,20-trione, i.e. 6-chloro-9α-bromo-6-dehydro-11-keto-progesterone, with a yield of about 55% of the theoretical amount.

*Example 14*

In the method of the previous example the stream of dry hydrogen chloride was substituted by a stream of dry hydrogen bromide which was introduced for 1 hour; there was thus obtained 6,9α-dibromo-$\Delta^{4,6}$-pregnadiene-3,11,20-trione.

*Example 15*

A mixture of 5 g. of 17α-acetoxy-progesterone, 10 g. of chloranil, 125 cc. of ethyl acetate and 25 cc. of acetic acid was refluxed for 55 hours under an atmosphere of nitrogen. After cooling it was washed with 10% aqueous sodium hydroxide solution until the washings were colorless; the organic layer was washed with water to neutral, dried over anhydrous sodium sulfate and evaporated to dryness. Crystallization from methylene chloride-hexane afforded the pure 6-dehydro-17α-acetoxy progesterone, with M.P. 218–220°, $\lambda_{max}$ 284 m$\mu$, log $\epsilon$ 4.42.

In accordance with the further treatment described in Example 11, 17α-acetoxy-6-dehydro-progesterone was oxidized to 17α-acetoxy-6α,7α-oxido-progesterone which was converted, via the 6β-fluoro-7α-hydroxy-derivative, into 17α-acetoxy-6-fluoro-6-dehydro-progesterone.

*Example 16*

By the method described in Example 11, $\Delta^4$-pregnene-17α,21-diol-3,20-dione diacetate described in U.S. Patent 2,802,839 was converted successively into $\Delta^{4,6}$-pregnadiene-17α,21-diol-3,20-dione diacetate, 6α,7α-oxido-$\Delta^4$-pregnene-17α,21-diol-3,20-dione diacetate, and finally 6-chloro-$\Delta^{4,6}$-pregnadiene-17α,21-diol-3,20-dione diacetate.

*Example 17*

A mixture of 1 g. of 17α-methyl-19-nor-6α,7α-oxido-testosterone obtained in accordance with Example 1, 2 g. of N-dimethyl aniline hydrofluoride and 50 cc. of ethanol was refluxed for 24 hours, concentrated to a small volume, cooled, diluted with water and the product was extracted with ethyl acetate; the extract was washed with water, dried over anhydrous sodium sulfate and evaporated to dryness. By chromatography of the residue on silica gel there was obtained 17α-methyl-6β-fluoro-7α-hydroxy-19-nor-testosterone.

*Example 18*

By the method described in Example 11, 9α-fluoro-11β,17α-dihydroxy-progesterone, described for instance, by Fried et al. in J. Am. Chem. Soc. 77, 1068 (1955) was converted into 6β-bromo-9α-fluoro-11β,17α-dehydroxy-progesterone, which was then dehydrobrominated to 11β,17α-dehydroxy-6-dehydro-progesterone by refluxing with collidine for 1 hour. Upon subsequent epoxidation, in accordance with the method of Example 1, there was obtained 9α-fluoro-6α,7α-oxido-$\Delta^4$-pregnen-11β,17α-diol-3,20-dione. By following the procedure of Example 17, the latter compound was converted into 6,9α-difluoro-11β,17α-dihydroxy-6-dehydro-progesterone.

*Example 19*

A mixture of 25 g. of 17α-hydroxy-progesterone, 1.25 lt. of t-butanol and 45 g. of chloranil was refluxed for 8 hours and left standing at room temperature overnight. The excess of chloranil was then filtered, and the solution evaporated to dryness under vacuo. There were added 500 cc. of ethyl acetate, the solid product filtered and stirred for 15 minutes with 10% aqueous sodium hydroxide solution, filtered again and washed with water until neutral. Crystallization from methylene chloride-hexane afforded the pure 6-dehydro-17α-hydroxy-progesterone in an average yield of 65%, M.P. 247–250° C.

$\lambda_{max.}^{ETOH}$ 284–286 m$\mu$, log $\epsilon$ 4.45

A solution of 10 g. of the 6-dehydro compound in 1 lt. of methylene chloride was treated with 375 cc. of a 8.8% solution of monoperphthalic acid in ether (6 mol equivalents) and the reaction mixture was allowed to stand at room temperature for 16 hours, the solution was then washed with 5% aqueous sodium carbonate solution and water, dried over anhydrous sodium sulfate and concentrated until crystallization started. After cooling, the precipitate was collected by filtration thus giving 6.5 g. of 17α-hydroxy-6α,7α-oxido-progesterone, M.P. 227–232°, [α]$_D$ +42 (chloroform)

$\lambda_{max.}^{ETOH}$ 240–242 m$\mu$, log $\epsilon$ 4.18

A suspension of 5 g. of this epoxide in 50 cc. of glacial acetic acid were treated with 3.8 cc. of concentrated hydrochloric acid. The reaction mixture was heated on the steam bath for 20 minutes (the solid went into solution within 5 minutes). The resulting dark solution was then poured into ice-salt water and the precipitate collected. Crystallization from methylene chloride-ether gave the pure 6-chloro-6-dehydro-17α-hydroxy-progesterone in 60–65% yield, M.P. 205–208°, [α]$_D$ +31.7 (chloroform)

$\lambda_{max.}^{ETOH}$ 286 m$\mu$, log $\epsilon$ 4.37

A solution of 2.5 g. of the above compound in 100 cc. of acetic acid and 50 cc. of acetic anhydride was treated with 2.5 g. of p-toluenesulfonic acid, and the reaction mixture was allowed to stand at room temperature for 1 hour. It was poured into water and stirred for 30 minutes to hydrolyze the excess of acetic anhydride. The formed precipitate was filtered and washed with water until neutral. Crystallization from acetone-hexane gave 17α-acetoxy-6-chloro-6-dehydro-progesterone, M.P. 208–210°, [α]$_D$ −11 (chloroform)

$\lambda_{max.}^{ETOH}$ 284–286 m$\mu$, log $\epsilon$ 4.37 in 80% yield

*Example 20*

By reaction with dry hydrogen chloride in acetic acid, for 3 hours and under anhydrous conditions as described in Example 11, 17α-acetoxy-6α,7α-oxido-progesterone, intermediate in Example 15, was converted into 17α-acetoxy-6-chloro-6-dehydro-progesterone, identical with the product obtained in Example 19.

*Example 21*

By refluxing hydrocortisone 11-trifluoroacetate-21-acetate, prepared from hydrocortisone acetate according to the procedure described by Lardon et al. in Helv. 37, 443 (1953), with chloranil in mixture with ethyl acetate and acetic acid, there was obtained the corresponding 6-dehydro derivative.

By following the epoxidation procedure of Example 11, the above compound was oxidized to produce 6α,7α-oxido-hydrocortisone 11-trifluoroacetate 21-acetate.

1 g. of the above compound in 50 cc. of acetone was treated with a slow stream of dry hydrogen chloride for half an hour at 0° C. The mixture was then diluted with water and the precipitate was collected, washed with water, dried and recrystallized from acetone-hexane, thus affording 6-chloro-6-dehydro-hydrocortisone 11-trifluoroacetate-21-acetate.

A mixture of 500 mg. of the above compound and 5 cc. of 1% methanolic potassium hydroxide solution was kept under an atmosphere of nitrogen for 1 hour at 0° C. and then acidified with acetic acid and concentrated to a small volume; after diluting with water the precipitate was collected by filtration, washed with water, dried and recrystallized from acetone-hexane, thus furnishing the free 6-chloro-6-dehydro-hydrocortisone.

*Example 22*

The 21-acetate of 9α-bromo-hydrocortisone described by Fried et al. in J. Am. Chem. Soc. 75, 2273 (1953) was converted into 9α-bromo-6-dehydro-hydrocortisone 21-acetate, by the dehydrogenation method described in Example 11.

The above dehydro compound was epoxidized to 9α-bromo - 6α,7α-oxido-Δ$^4$-pregnene-11β,17α,21-triol-3,20-dione 21-acetate by the reaction with monoperphthalic acid, as described in Example 1. A slow stream of dry hydrogen bromide was introduced for 1 hour into a solution of 1 g. of the above compound in 50 cc. of glacial acetic acid and the product was then isolated by diluting with water, collecting the precipitate and recrystallizing from acetone-hexane; there was thus obtained 6,9α-dibromo-6-dehydro-hydrocortisone 21-acetate.

*Example 23*

5 g. of the propionate of 17α-hydroxy-progesterone (Arch. Exp. Path. Pharm. 223, 244 (1954)) was dehydrogenated with chloranil, by the method of Example 1, to the corresponding 6-dehydro-derivative and epoxidized to 17α-propionoxy-6α,7α-oxido-progesterone by the reaction with monoperphthalic acid of Example 1.

A slow stream of dry hydrogen chloride was introduced for 1 hour into a solution of 1 g. of 17α-propionoxy-6α,7α-oxido-progesterone in 50 cc. of acetone, maintaining the temperature around 0° C.; the mixture was poured into water and the precipitate was collected, washed with water, dried and recrystallized from acetone-hexane, thus affording 17α - propionoxy-6-chloro-6-dehydro-progesterone.

*Example 24*

By treatment of 1 g. of 17α-acetoxy-6α,7α-oxido-progesterone prepared according to Example 15, in solution in 50 cc. of glacial acetic acid with dry hydrogen bromide for 1 hour, there was obtained 17α-acetoxy-6-bromo-6-dehydro-progesterone.

*Example 25*

A solution of 2 g. of 17α-acetoxy-6α,7α-oxido-progesterone prepared according to Example 15, in 100 cc. of acetic acid was treated with 5 cc. of concentrated hydrochloric acid and the mixture was kept at room temperature for 6 hours. The product was precipitated with water, collected by filtration and recrystallized from acetone-hexane, thus producing 17α-acetoxy-6-chloro-6-dehydro-progesterone in 50% yield, identical with the product obtained in Examples 19 and 20.

*Example 26*

A mixture of 2 g. of 17α-acetoxy-6α,7α-oxido-progesterone prepared as described in Example 15, 4 g. of pyridine hydrochloride and 100 cc. of methanol was refluxed, then diluted with water and the product was extracted with ethyl acetate. After evaporating to dryness the residue was purified by chromatography on neutral alumina, thus giving 17α-acetoxy-6β-chloro-Δ$^4$-pregnen-7α-ol-3,20-dione; the latter was treated with a stream of dry hydrogen chloride in glacial acetic acid solution, in accordance with the method described in Example 1, to furnish 17α-acetoxy-6-chloro-6-dehydro-progesterone.

*Example 27*

17α-ethinyl-testosterone was converted to its 6-dehydro-derivative by the dehydrogenation method described in Example 11.

By epoxidation of the latter compound, in accordance with the method of Example 11, there was obtained 17α-ethynyl - 6α,7α - oxido - Δ$^4$ - androsten - 17β - ol - 3 - one. Upon subsequent treatment with dry hydrogen chloride in glacial acetic acid solution, in accordance with Example 1, there was obtained 6-chloro-17α-ethinyl-Δ$^{4,6}$-androstadien-17β-ol-3-one.

*Example 28*

By treating a solution of 2 g. of 17α-acetoxy-6α,7α-oxido-progesterone in 50 cc. of chloroform with a stream of dry hydrogen chloride for 6 hours at 0° C. there was obtained, upon evaporation of the solvent, 17α-acetoxy-6-chloro-6-dehydro-progesterone which was purified by chromatography on neutral alumina, identical with the product obtained in Example 25.

*Example 29*

Example 13 was repeated; however, by reaction of 6α,7α-oxido-9α-bromo-11-keto-progesterone with dry hydrogen chloride in glacial acetic acid, for approximately 2 hours at a temperature around 25° C., followed by isolation and purification, there was obtained 6-chloro-6-dehydro-9α-bromo-11-keto-progesterone in a 30% yield.

*Example 30*

A solution of 7.5 g. of 6-dehydrocortisone-21-acetate described, for instance by Mattox et al. in J. Biol. Chem. 197, 261 (1952), in 500 cc. of methylene chloride was treated with 375 cc. of a 5.5% solution of monoperphthalic acid in ether (6 molar equivalents) following the procedure of Example 1 and there was thus obtained 6α,7α-oxido-Δ$^4$-pregnene-17α,21-diol-3,11,20-trione 21 - acetate, M.P. 265–268° C.; λ$_{max}$ 240–2 mμ, log ε 4.13.

A solution of 5 g. of 6α,7α-oxido-Δ$^4$-pregnene-17α,21-diol-3,11,20-trione 21-acetate in 400 cc. of anhydrous chloroform was cooled in a Dry Ice-acetone bath to −70° C. and then a mixture of 11.6 cc. of anhydrous tetrahydrofurane and 8 g. of anhydrous hydrogen fluoride was slowly added under stirring. Processing the mixture as described in Example 1, and purification by chromatography on silica, yielded the pure 6β-fluoro-7α-hydroxy-cortisone 21-acetate, M.P. 250° C.; λ$_{max}$ 230–2 mμ, log ε 4.07.

A mixture of 3 g. of the above compound and 150 cc. of glacial acetic acid was treated with a slow stream of dry hydrogen chloride until saturation and then the container was stoppered and kept at room temperature for 24 hours; after pouring into ice cold salt water the product was extracted with methylene chloride and the extract was washed with 5% aqueous sodium carbonate solution and water, dried over anhydrous sodium sulfate and evaporated to dryness, thus leaving as a residue 6-fluoro-6-dehydro-cortisone 21-acetate.

*Example 31*

A slow stream of dry hydrogen chloride was introduced into a suspension of 4.77 g. of 6α,7α-oxido-Δ$^4$-pregnene-17α,21-diol-3,11,20-trione 21-acetate, prepared as described in Example 30, in 250 cc. of glacial acetic acid. After a short time all the solid material entered in solution and the treatment with hydrogen chloride was continued for a total of 5 hours. The mixture was concentrated to one third of its volume, under reduced pressure and without heating, and then poured into ice water; the precipitate was collected, washed with water to neutral, dried and recrystallized from acetone-ether. There was thus obtained 6-chloro-6-dehydro-cortisone 21-acetate, M.P. 198–200° C.; $[\alpha]_D$ +228° (dioxane); $\lambda_{max}$ 282 m$\mu$, log $\epsilon$ 4.28; by chromatography of the mother liquors on 30 times the weight of silica there was obtained an additional quantity of the same material plus a smaller amount of 6$\beta$-chloro-7$\alpha$-hydroxy-cortisone 21-acetate M.P. 229–231°, as by-product.

Example 32

A mixture of 1 g. of 6-fluoro-6-dehydro-cortisone 21-acetate, 50 cc. of t-butanol, 100 mg. of selenium dioxide and 2 drops of pyridine was refluxed for 18 hours under an atmosphere of nitrogen and filtered through celite. The filtrate was evaporated to dryness under reduced pressure, the residue was dissolved in acetone, refluxed with decolorizing charcoal, the acetone was evaporated and the product was purified by chromatography on neutral alumina. There was thus obtained 6-fluoro-$\Delta^{1,4,6}$-pregnatriene-17$\alpha$,21-diol-3,11,20-trione 21-acetate.

Example 33

A mixture of 5 g. of 9$\alpha$-fluoro-cortisone 21-acetate, 100 cc. of xylene and 4 g. of chloranil was refluxed for 12 hours, cooled, diluted with 200 cc. of ether and washed with 2% sodium hydroxide solution and water, dried over anhydrous sodium sulfate and evaporated to dryness under reduced pressure. The residue was purified by chromatography, thus yielding 9$\alpha$-fluoro-6-dehydro-cortisone 21-acetate.

By subsequent reactions as described in Example 30 there were successively obtained 9$\alpha$-fluoro-6$\alpha$,7$\alpha$-oxido-$\Delta^4$-pregnene-17$\alpha$,21-diol-3,11,20-trione 21-acetate, 6$\beta$,9$\alpha$-difluoro-7$\alpha$-hydroxy-cortisone 21-acetate and finally 6,9$\alpha$-difluoro-6-dehydro-cortisone acetate.

Example 34

A solution of 5 g. of 9$\alpha$-fluoro-16$\alpha$-methyl-hydrocortisone 21-acetate described by G. E. Arth et al. in J. Am. Chem. Soc. 80, 3161, (1958), in 50 cc. of anhydrous dioxane was treated with 6 cc. of ethyl orthoformate and 180 mg. of p-toluenesulfonic acid and the mixture was stirred at room temperature for 40 minutes; under stirring there was then added 15 cc. of pyridine followed by 600 cc. of water and the product was extracted with ether. The ether extract was washed with water, dried over anhydrous sodium sulfate and evaporated to dryness, thus giving 16$\alpha$-methyl-9$\alpha$-fluoro-3-ethoxy-$\Delta^{3,5}$-pregnadiene-11$\beta$,17$\alpha$,21-triol-20-one-21-acetate.

A mixture of 4 g. of the above compound, 120 cc. of acetone and 20 cc. of water was cooled to 0° C. and treated with 4 g. of N-bromosuccinimide and then with 2.2 g. of glacial acetic acid; the mixture was stirred for 3 hours at a temperature between 0 and 5° C., then ice was added and the mixture was kept overnight in the refrigerator. The precipitate formed was collected, washed with water, dried under vacuum and recrystallized from acetone-hexane, in the presence of a few drops of pyridine. There was thus obtained 6$\beta$-bromo-9$\alpha$-fluoro-16$\alpha$-methyl-hydrocortisone 21-acetate.

A solution of 3 g. of the above compound in 10 cc. of dimethylformamide was added to a stirred suspension of 1.5 g. of calcium carbonate in 30 cc. of dimethylformamide previously heated nearly to boiling. The mixture was refluxed for 15 minutes, filtered, poured into water and acidified with hydrochloric acid. The precipitate formed was collected, washed to neutral and recrystallized, thus affording 9$\alpha$-fluoro-16$\alpha$-methyl-6-dehydro-hydrocortisone 21-acetate.

Subsequent oxidation with monoperphthalic acid, in accordance with the method of Example 1, furnished 9$\alpha$-fluoro-16$\alpha$-methyl-6$\alpha$,7$\alpha$-oxido-$\Delta^4$-pregnene-11$\beta$,17$\alpha$,21-triol-3,20-dione 21-acetate.

The latter compound was then converted by the further steps described in Example 30 to 6$\beta$,9$\alpha$-difluoro-16$\alpha$-methyl-$\Delta^4$-pregnene-7$\alpha$,11$\beta$,17$\alpha$,21-tetrol-3,20-dione 21-acetate and finally to 6,9$\alpha$-difluoro-16$\alpha$-methyl-$\Delta^{4,6}$-pregnadiene-11$\beta$,17$\alpha$,21-triol-3,20-dione 21-acetate, i.e. 6,9$\alpha$-difluoro-6-dehydro-cortisol 21-acetate.

Example 35

9$\alpha$-fluoro-16$\alpha$-methyl-6$\alpha$,7$\alpha$-oxido-$\Delta^4$-pregnene-17$\alpha$,21-diol-3,11,20-trione 21-acetate is obtained from 9$\alpha$-fluoro-16$\alpha$-methyl-$\Delta^{4,6}$-pregnadiene-17$\alpha$,21-diol-3,11,20-trione 21-acetate by the procedure described in Example 30, and is further treated as described in Example 31 to obtain 6-chloro-9$\alpha$-fluoro-16$\alpha$-methyl-6-dehydro-cortisone 21-acetate.

A suspension of 500 mg. of the latter in 10 cc. of absolute methanol was cooled to 0° C., flushed with nitrogen and treated with a solution of sodium methoxide prepared by dissolving 60 mg. of sodium metal in 10 cc. of methanol; the mixture was stirred at a temperature around 0° C. for 1 hour under an atmosphere of nitrogen and then poured into 50 cc. of aqueous saturated sodium chloride solution; the precipitate was collected, washed with a little cold water, dried and recrystallized from acetone-hexane. There was thus obtained the free 6-chloro-9$\alpha$-fluoro-16$\alpha$-methyl-6-dehydro-cortisone.

A solution of 500 mg. of the above compound in 5 cc. of pyridine was mixed with 1 g. of benzoyl chloride, kept overnight at room temperature, poured into 300 cc. of water, heated for 1 hour on the steam bath, cooled and the precipitate was collected, washed with water, dried and recrystallized from acetone-hexane. There was thus obtained 6-chloro-9$\alpha$-fluoro-16$\alpha$-methyl-6-dehydro-cortisone 21-benzoate.

Upon subsequent dehydrogenation, in accordance with the method of Example 32, there was obtained 16$\alpha$-methyl-6-chloro-9$\alpha$-fluoro-$\Delta^{1,4,6}$-pregnatriene-17$\alpha$,21-diol-3,11,20-trione 21-benzoate.

Example 36

1 g. of 6-fluoro-6-dehydro-cortisone 21-acetate prepared as described in Example 30 was treated with 50 cc. of a methanol solution of potassium hydroxide, for 1 hour at 0° C.; the mixture was acidified with acetic acid, concentrated to about 10 cc. under reduced pressure, poured into ice water and the precipitate was filtered, washed with water, dried and recrystallized from acetone-hexane. There was thus obtained the free 6-fluoro-6-dehydro-cortisone.

A mixture of 500 mg. of the above compound, 5 cc. of pyridine and 1 cc. of propionic anhydride was kept overnight at room temperature, poured into water, heated for half an hour on the steam bath and cooled. The precipitate was collected, washed with water, dried and recrystallized from acetone-hexane, thus yielding 6-fluoro-6-dehydro-cortisone 21-propionate.

Upon subsequent dehydrogenation, in accordance with the method of Example 32, there was obtained 6-fluoro-$\Delta^{1,4,6}$-pregnatriene-17$\alpha$,21-diol-3,11,20-trione 21-propionate.

Example 37

A suspension of 6 g. of 16$\alpha$-hydroxy-cortisone described by Ellis et al. in J. Chem. Soc., 4383 (1955), in 150 cc. of acetone was treated dropwise under stirring with 1.5 cc. of 70% perchloric acid and the resulting solution was kept for 30 minutes at room temperature. It was then poured into 5% aqueous sodium bicarbonate solution and the precipitate was filtered, washed with water and dried. There was thus obtained the 16,17-acetonide of 16$\alpha$-hydroxy-cortisone.

A mixture of 6 g. of the above compound, 48 cc. of pyridine and 7.6 cc. of acetic anhydride was kept overnight at room temperature and then poured into ice water. The precipitate was collected, consisting of 16$\alpha$, 17α-isopropylidenedioxy-Δ⁴-pregnen-21-ol-3,11,20 - trione 21-acetate, (16,17-acetonide of 16α-hydroxy cortisone 21-acetate), which was purified by recrystallization from acetone-hexane.

In accordance with the method described in Example 30, this compound was oxidized to the 21-acetate-16,17-acetonide of 6α,7α-oxido-16α-hydroxy-cortisone.

The latter was further treated as described in Example 31 to obtain the corresponding 21-acetate-16,17-acetonide of 6-chloro-16α-hydroxy-6-dehydro-cortisone.

*Example 38*

A solution of 500 mg. of 6β-chloro-7α-hydroxy-cortisone 21-acetate, obtained as a by-product in Example 34, in 10 cc. of acetic acid was treated with 5 drops of 70% perchloric acid and the reaction mixture was allowed to stand at room temperature for 24 hours. It was then poured into water, extracted with methylene chloride, the organic extract washed with 5% aqueous sodium carbonate solution and water, dried over anhydrous sodium sulfate and evaporated to dryness under vacuo. Crystallization from acetone-ether gave 6-chloro-6-dehydro-cortisone 21-acetate identical with the product obtained in Example 31.

*Example 39*

A solution of 2 g. of 6-dehydro-17α-ethynyl-testosterone, intermediate in Example 27, in 200 cc. of methylene chloride was treated with 6 mol equivalents of perbenzoic acid in chloroformic solution. The reaction mixture was kept at 5° C. for 48 hours, washed with 5% sodium carbonate solution and water to neutral, dried over anhydrous sodium sulfate and concentrated until precipitation started; there was thus obtained 17α-ethynyl-6α,7α-oxido-Δ⁴-androsten-17β-ol-3-one, identical with the product obtained in Example 27. Subsequent treatment with pyridine hydrofluoride followed by dehydration with dry hydrogen chloride in acetic acid, in accordance with the method of Example 12 furnished finally 6-fluoro-6-dehydro-17α-ethynyl-testosterone.

*Example 40*

By following the epoxidation method of Example 39, 6-dehydro-cortisone acetate was converted into the corresponding 6α,7α-epoxide, identical to that obtained in Example 30.

*Example 41*

In accordance with the method of Example 33, 9α-fluoro-11-keto-17α-acetoxy-progesterone was converted into the corresponding 9α-fluoro-11-keto-17-acetoxy-6-dehydro-progesterone. By subsequent reaction with monoperphthalic acid as described in the same example the latter was converted into the 6α,7α-oxide.

By following the procedure of Example 19, the last mentioned compound gave finally 6-chloro-9α-fluoro-11-keto-17α-acetoxy-6-dehydro-progesterone.

The starting material, 9α-fluoro-11-keto-17α-acetoxy-progesterone was obtained by oxidation of the well known (Fried) 9α-fluoro-11β,17α-dihydroxy-progesterone, by the method described by E. R. H. Jones et al. in J. Chem. Soc., 39 (1946) followed by the conventional C-17 acetylation (Turner) with acetic anhydride-acetic acid and p-toluenesulfonic acid catalyzed.

We claim:

1. A process for the production of a 6-halo-Δ⁴,⁶-3-keto-steroid selected from the group consisting of the 6-halo-Δ⁴,⁶-3-keto-androstanes, the 19-nor analogs of the aforesaid androstanes, the 6-halo-Δ⁴,⁶-pregnanes wherein the halo group is selected from the group consisting of chloro, bromo and fluoro and the 19-nor-analogs of the aforesaid pregnanes, comprising the steps of reacting a corresponding 6-unhalogenated 6α,7α-oxido-Δ⁴-3 keto-steroid with a hydrohalogenating agent selected from the group consisting of hydrogen fluoride, hydrogen chloride, hydrogen bromide, the hydrofluorides, hydrochlorides and hydrobromides of cyclic tertiary amines, in a first inert organic solvent, to produce the corresponding 6β-halo-7α-hydroxy-Δ⁴-3-ketone and reacting the latter halohydrin with a dehydrating agent in a second inert organic solvent to dehydrate the said halohydrin to the corresponding 6-halo-Δ⁴,⁶-3-ketone.

2. The process as described in claim 1, characterized in that the hydrohalogenating agent is hydrogen fluoride.

3. The process as described in claim 1, characterized in that 6α,7α-oxido-Δ⁴-3-keto-steroid is reacted with hydrogen fluoride in tetrahydrofurane-chloroform as the first solvent, thereby obtaining the corresponding 6β-fluoro-7α-hydroxy-Δ⁴-3-keto-steroid as an intermediary.

4. The process as described in claim 1, characterized in that the reaction of the 6α,7α-epoxide with the hydrohalogenating agent is carried out at a temperature between about −70° C. C. and room temperature.

5. The process as described in claim 1, characterized in that the 6β-halo-7α-hydroxy-Δ⁴-3-ketone is reacted with dry halogen chloride as the dehydrating agent.

6. The process as described in claim 1, characterized in that the 6β-halo-7α-hydroxy-Δ⁴-3-ketone is reacted with perchloric acid as the dehydrating agent.

7. The process as described in claim 1, characterized in that the hydrohalogenating agent is dry hydrogen chloride and that the 6α,7α-epoxide is reacted with the latter agent in a glacial acetic acid solution, so as to obtain in a single step the corresponding 6-chloro-Δ⁴,⁶-3-keto-steroid.

8. The process described in claim 1, characterized in that the first inert solvent is selected from the group consisting of lower aliphatic hydrocarbon carboxylic acids, lower aliphatic alcohols, ketones, halogenated hydrocarbons and ethers.

9. A process for the production of a 6-halo-Δ⁴,⁶-3-keto-steroid selected from the group consisting of the 6-halo-Δ⁴,⁶-3-keto-androstanes, the 19-nor analogs of the aforesaid androstanes, the 6-halo-Δ⁴,⁶-3-keto-pregnanes and the 19-nor-analogs of the aforesaid pregnanes wherein the halo group is selected from the group consisting of chloro, bromo and fluoro, comprising the steps of reacting a corresponding 6-unhalogenated Δ⁴,⁶-3-keto-steroid with an organic peracid to form the 6α,7α-oxido-Δ⁴-3-keto-steroid thereof, reacting the latter epoxide with a hydrohalogenating agent selected from the group consisting of hydrogen fluoride, hydrogen chloride, hydrogen bromide, the hydrofluorides, hydrochlorides and hydrobromides of cyclic tertiary amines in a first inert organic solvent to produce the corresponding 6β-halo-7α-hydroxy-Δ⁴-3-ketone and reacting the latter halohydrin with a dehydrating agent in a second inert organic solvent to dehydrate the said halohydrin to the corresponding 6-halo-Δ⁴,⁶-3-ketone.

10. A process for the production of a 6-halo-Δ⁴,⁶-3-keto-steroid selected from the group consisting of the 6-halo-Δ⁴,⁶-3-keto-androstanes, the 19-nor-analogs of the aforesaid androstanes, the 6-halo-Δ⁴,⁶-3-keto pregnanes and the 19-nor-analogs of the aforesaid pregnanes wherein in the halo group is selected from the group consisting of chloro, bromo and fluoro, comprising the steps of reacting a corresponding 6-unhalogenated-Δ⁴-3-keto-steroid starting compound with an organic dehydrogenating agent so as to introduce a Δ⁶ double bond into said starting steroid, reacting the resulting Δ⁴,⁶-3-ketone with a peracid to obtain the corresponding 6α,7α-oxido-Δ⁴-3-ketone, reacting the latter with a hydrohalogenating agent selected from the group consisting of hydrogen fluoride, hydrogen chloride, and hydrogen bromide in their dry form and and in the form of their complex salts with cyclic tertiary amines, in an inert organic solvent, and reacting the resulting 6β-halo-7α-hydroxy-Δ⁴-3-ketone with a dehydrating agent in an inert organic solvent so as to obtain the corresponding 6-halo-Δ⁴,⁶-3-ketone.

11. The process described in claim 10, further comprising the step of reacting the 6-halo-Δ⁴,⁶-3-ketone with a dehydrogenating agent to obtain the corresponding 6-halo-$\Delta^{1,4,6}$-3-ketone steroid.

12. The process as described in claim 10, wherein said starting steroid is a $\Delta^4$-3-ketone of the androstane series.

13. The process as described in claim 10, wherein said starting material is a $\Delta^4$-3-ketone of the 19-nor-androstane series.

14. The process as described in claim 10, wherein said starting material is a $\Delta^4$-3-ketone of the pregnane series.

15. The process as described in claim 10, wherein said starting material is a $\Delta^4$-3-ketone of the 19-nor-pregnane series.

16. The process as described in claim 10, characterized in that said dehydrogenating agent is chloranil.

17. A process for the production of a 6-halo-$\Delta^{4,6}$-3-keto-steroid selected from the group consisting of the 6-halo-$\Delta^{4,6}$-3-keto-androstanes, the 19-nor-analogs of the aforesaid androstanes, the 6-halo-$\Delta^{4,6}$-3-keto-pregnanes and the 19-nor-analogs of the aforesaid pregnanes wherein the halo group is selected from the group consisting of chloro, bromo and fluoro, comprising the steps of reacting a corresponding 6-unhalogenated-$\Delta^{3,5}$-3-(lower alkoxy) starting steroid with an agent capable of furnishing the elements of hypobromous acid for addition to said starting steroid and reacting the resulting 6-bromo-$\Delta^4$-3-ketone with a dehydrobrominating agent, so as to obtain a $\Delta^{4,6}$-3-ketone, treating the latter with a peracid to obtain the corresponding 6$\alpha$,7$\alpha$-oxido-$\Delta^4$-3-ketone, reacting the latter with a hydrohalogenating agent selected from the group consisting of hydrogen fluoride, hydrogen chloride, hydrogen bromide and their salts with cyclic tertiary amines, in an inert organic solvent, and reacting the resulting 6$\beta$-halo-7$\alpha$-hydroxy-$\Delta^4$-3-ketone with a dehydrating agent in an inert organic solvent to obtain the corresponding 6-halo-$\Delta^{4,6}$-3-ketone.

18. The process as described in claim 17, wherein said agent for furnishing the elements of hypobromous acid is N-bromosuccinimide.

19. The process as described in claim 17, wherein said agent for furnishing the elements of hypobromous acid is an alcoholic sodium hypobromite solution.

References Cited in the file of this patent
UNITED STATES PATENTS

| | | |
|---|---|---|
| 2,670,357 | Murray et al. | Feb. 23, 1954 |
| 2,891,079 | Dodson et al. | June 16, 1959 |